June 10, 1952 J. ENSINK 2,600,226

DEVICE TO MINIMIZE INTERFERENCE BETWEEN
DIAL IMPULSES IN A CARRIER SYSTEM
Filed March 10, 1948

JOHANNES ENSINK
INVENTOR.

BY [signature]

ATTORNEY.

Patented June 10, 1952

2,600,226

UNITED STATES PATENT OFFICE 2,600,226

DEVICE TO MINIMIZE INTERFERENCE BETWEEN DIAL IMPULSES IN A CARRIER SYSTEM

Johannes Ensink, Eindhoven, Netherlands, assignor to Hartford National Bank and Trust Company, Hartford, Conn., as trustee Application March 10, 1948, Serial No. 14,128
In the Netherlands April 29, 1947

7 Claims. (Cl. 179—15.5)

This invention relates to a transmitting arrangement for a carrier-wave telephone system, in which the conversation to be transmitted and the carrier-wave are fed to a modulator in such manner that the carrier-wave is suppressed during transmission of the conversation and the signaling is effected by transmitting the carrier wave which, to this end, is fed to the output of the modulator.

Figure 1:
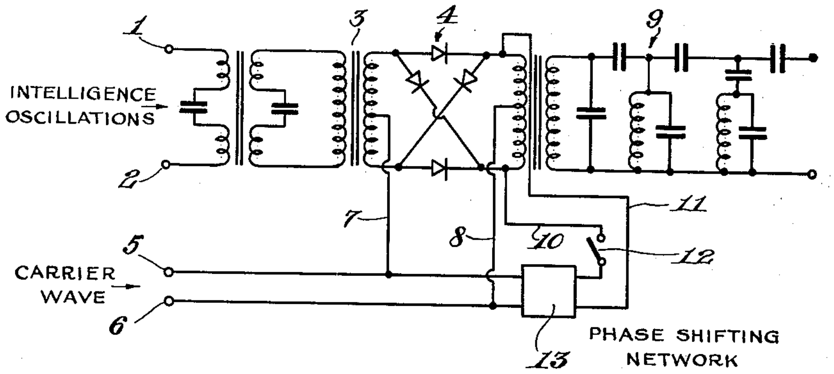
Figure 2:
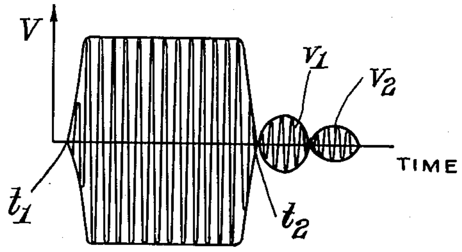

In order that the invention may be more clearly understood and readily carried into effect, it will now be described more fully with reference to the accompanying drawing, given by way of example, in which:

Fig. 1 represents diagrammatically an arrangement of this type, the disadvantages of this arrangement being explained with reference to Fig. 2.

The conversation to be transmitted is supplied to the input terminals 1 and 2 and fed, in phase opposition, to a balanced modulator 4 through a filter 3.

To this balanced modulator the carrier-wave alternating voltage is supplied in phase, through the leads 7 and 8, to the input terminals 5 and 6.

In this arrangement, as is known, the voltage of carrier-wave frequency is suppressed and only the upper and lower conversation side bands are yielded. The desired conversation side band is subsequently selected by means of a band-pass filter 9 and supplied to the remaining transmitting means e. g. a transmission line or another modulation stage.

For signaling purposes, for instance for transmitting dialing pulses, the carrier-wave alternating voltage is supplied, through leads 10 and 11 and the switch 12, to the output of the modulator. In this respect it is to be noted that these carrier-wave pulses are passed by the filter 9, though attenuated in most cases.

It has been found, however, that in transmitting e. g. a selection pulse of definite duration this pulse is followed by several disturbing voltages. In Fig. 2 the alternating voltage V of a dialing pulse is plotted as a function of the time $t$. The length of the pulse corresponds with a duration from $t_1$ to $t_2$. After the time $t_2$, however, an alternating voltage still appears, due to which disturbances may occur in the signaling at the receiver end of the carrier-wave telephone system.

The occurrence of these disturbances may be explained as follows:

The modulator 4 which provides for modulation in a forward direction exhibits, in the opposite direction, a demodulating effect, with the result that a low-frequency signal occurs at the input of the modulator upon supplying the signaling pulses to the output. Particularly when the filter 3 is constructed as a high-pass filter this low-frequency signal will be reflected at this filter, and subsequently this signal traverses the modulator in the normal direction of transmission, when it is again modulated on the carrier wave. In this respect it is pointed out that the filter 3 is often constructed as a high-pass filter or as a transformer with a direct current blocking condenser, the further selection of the desired frequency band being effected by means of the band-pass filter 9 after modulation.

Circuit arrangements of this type exhibit the aforesaid disadvantage.

The occurrence of disturbing alternating voltages will be explained more fully with reference to the following calculation.

Assuming the carrier-wave frequency to be $p$ and the pulse frequency to be $q$, then the pulse signal is proportional to $\cos pt \cos qt$. However, the carrier-wave voltage is likewise supplied to the modulator through the leads 7 and 8 as a result of which a modulation product $\cos^2 pt \cos qt$ is produced at the input which, upon developing the progression, yields the terms $\frac{1}{2} \cos qt + \frac{1}{4} \cos (2pt+qt) + \frac{1}{4} \cos (2pt-qt)$, the term $\frac{1}{2} \cos qt$ causing the aforesaid disturbances.

Figure 3:
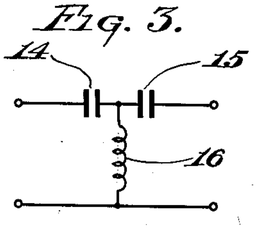

In the device according to the invention this disadvantage is obviated since the supply of the signaling pulses to the modulator outputs is effected through a phase-shifting network. This network is depicted in blockform in Fig. 1 at 13 and may be constructed as a known circuit arrangement. For this purpose use may, for instance, be made of the network shown in Fig. 3 which comprises condensers 14 and 15 and the inductance 16. These impedances are so chosen as to produce the desired phase shift of approximately 90°.

If, for instance, a phase displacement of 90° is brought about, a modulation product $\sin pt \cos pt \cos qt$ occurs which upon developing the progression yields $\frac{1}{4} \sin (2pt+qt) + \frac{1}{4} \sin (2pt-qt)$. Consequently, no low-frequency signal occurs at the input, so that the occurrence of voltages $V_1$ and $V_2$ caused by reflection is avoided.

What I claim is:

1. In a carrier wave telephony system, the combination comprising a carrier suppressing modulator means having an output impedance, means to apply intelligence oscillations as an input to said modulator, means to apply a carrier wave as an input to said modulator thereby to develop across said impedance side band components of said oscillations and said wave wherein said wave is suppressed, means including a phase-shift to impress said carrier wave across said output impedance in a phase displaced with respect to the carrier wave applied as an input to said modulator, and means to interrupt the carrier wave impressed on said output impedance to produce signalling pulses.

2. In a carrier wave telephony system, the combination comprising a balanced modulator having an output impedance, means to apply intelligence oscillations in phase opposition as an input to said modulator, means to apply a carrier wave in phase coincidence as an input to said modulator thereby to develop across said impedance side band components of said oscillations and said wave wherein said wave is suppressed, means including a phase-shifter to impress said carrier wave across said output impedance in a phase displaced approximately 90 degrees with respect to the carrier wave applied as an input to said modulator, and means to interrupt the carrier wave impressed on said output impedance to produce signalling pulses.

3. In a carrier wave telephony system, the combination comprising a balanced modulator having an output impedance, means to apply low-frequency intelligence oscillations in phase opposition as an input to said modulator, means to apply a high-frequency carrier wave in phase coincidence as an input to said modulator thereby to develop across said impedance side band components of said oscillations and said wave wherein said wave is suppressed, means including a phase-shifter to impress said carrier wave across said output impedance in a phase displaced 90 degrees with respect to the carrier wave applied as an input to said modulator, dial switching means to interrupt the carrier wave impressed on said output impedance to produce signalling pulses, and a filter network coupled to said output impedance to eliminate one of said side band components.

4. In a carrier wave telephony system, the combination comprising an input circuit for connection to a source of low-frequency intelligence oscillations, an output circuit for connection to an outgoing telephone line, a balanced modulator having an output impedance coupled to said output circuit, means coupling said input circuit to said balanced modulator to apply said oscillations in phase opposition as an input thereto, means to apply a high-frequency carrier wave in phase coincidence as an input to said balanced modulator thereby to develop across said output impedance side band components of said oscillations and said wave wherein said wave is suppressed, said output circuit including filter means passing only one of said side band components, means including a phase-shifting network to apply said carrier wave across said output impedance in a phase displaced with respect to the carrier wave applied as an input to said modulator, and means to interrupt the carrier wave impressed on said output impedance to produce signalling pulses in said output circuit.

5. In a carrier wave telephony system, the combination comprising an input circuit for connection to a source of low-frequency intelligence oscillations, an output circuit for connection to an outgoing telephone line, a balanced modulator having an output impedance coupled to said output circuit, means coupling said input circuit to said balanced modulator to apply said oscillations in phase opposition as an input thereto, means to apply a carrier wave in phase coincidence as an input to said balanced modulator thereby to develop across said output impedance side band components of said oscillations and said wave wherein said wave is suppressed, said output circuit including a filter network accommodating but one of said side band components, means including a phase-shifting network to impress said carrier wave across said output impedance in a phase displaced 90 degrees with respect to the carrier wave applied as an input to said modulator, and dial switching means to interrupt the carrier wave impressed on said output impedance to produce signalling pulses in said output circuit.

6. In a carrier wave telephony system, the combination comprising a balanced modulator including an input transformer having a primary and a center-tapped secondary, an output transformer having a center-tapped primary and a secondary, a first pair of rectifiers each connected between one end of the secondary of said input transformer and the corresponding end of the primary in said output transformer and a second pair of rectifiers each connected between one end of the secondary of said input transformer and the non-corresponding end of the primary of said output transformer, means to apply intelligence oscillations to the primary of said input transformer, means to apply a carrier wave between the center tap in said center-tapped secondary and the center tap in said center-tapped primary, means including a phase-shifting network to apply said carrier wave across the ends of said center-tapped primary in a phase displaced with respect to the carrier wave as applied between said center taps, and switching means to interrupt the carrier wave impressed across said center-tapped primary to produce signalling pulses in the output of said balanced modulator.

7. In a carrier wave telephony system, the combination comprising a balanced modulator including an input transformer having a primary and a center-tapped secondary, an output transformer having a center-tapped primary and a secondary, a first pair of rectifiers each connected between one end of the secondary of said input transformer and the corresponding end of the primary in said output transformer and a second pair of rectifiers each connected between one end of the secondary of said input transformer and the non-corresponding end of the primary of said output transformer, means to apply low-frequency intelligence oscillations to the primary of said input transformer, means to apply a high-frequency carrier wave between the center tap in said center-tapped secondary and the center tap in said center-tapped primary, means including a phase-shifting network to apply said carrier wave across the ends of said center-tapped primary in a phase displaced approximately 90 degrees with respect to the carrier wave as applied between said center taps, and dial switching means to interrupt the carrier wave impressed across said center tap primary to produce signalling pulses in the output of said balanced modulator.

JOHANNES ENSINK.

REFERENCES CITED

The following references are of record in the file of this patent:

UNITED STATES PATENTS

| Number | Name | Date |
|---|---|---|
| 1,472,821 | Affel | Nov. 6, 1923 |
| 1,773,116 | Potter | Aug. 19, 1930 |
| 2,184,826 | Weissner | Dec. 26, 1939 |
| 2,210,957 | Skillman | Aug. 13, 1940 |
| 2,215,482 | Skillman | Sept. 24, 1940 |
| 2,215,483 | Skillman | Sept. 24, 1940 |
| 2,231,958 | Skillman | Feb. 18, 1941 |
| 2,450,352 | Piety | Sept. 28, 1948 |

FOREIGN PATENTS

| Number | Country | Date |
|---|---|---|
| 523,066 | Great Britain | July 4, 1940 |
| 858,561 | France | Nov. 28, 1940 |